United States Patent
John et al.

(10) Patent No.: US 10,612,723 B2
(45) Date of Patent: Apr. 7, 2020

(54) SOLENOID VALVE FOR INFLATION SYSTEM

(71) Applicant: GOODRICH CORPORATION, Charlotte, NC (US)

(72) Inventors: Poly Puthur John, Karnataka (IN); Ashish Kumar Agarwal, Karnataka (IN); Jeevanandham Masilamani, Bangalore Rural (IN)

(73) Assignee: GOODRICH CORPORATION, Charlotte, NC (US)

( * ) Notice: Subject to any disclaimer, the term of this patent is extended or adjusted under 35 U.S.C. 154(b) by 144 days.

(21) Appl. No.: 15/486,503

(22) Filed: Apr. 13, 2017

(65) Prior Publication Data
US 2018/0231185 A1    Aug. 16, 2018

(30) Foreign Application Priority Data
Feb. 13, 2017    (IN) .............................. 201711005085

(51) Int. Cl.
*F16K 15/20*    (2006.01)
*F17C 5/06*    (2006.01)
(Continued)

(52) U.S. Cl.
CPC .............. *F17C 5/06* (2013.01); *B60R 21/268* (2013.01); *B63C 9/18* (2013.01); *B63C 9/24* (2013.01);
(Continued)

(58) Field of Classification Search
CPC .... F17C 5/06; F16K 31/0675; F16K 31/0655; F16K 15/20; F16K 15/025; B63C 9/18; B63C 9/24; B60R 21/268
See application file for complete search history.

(56) References Cited

U.S. PATENT DOCUMENTS 4,275,901 A * 6/1981 Okada ................ B60R 21/0136
                                              280/731
5,161,776 A * 11/1992 Nicholson ............ B60R 21/017
                                              251/30.05
(Continued)

FOREIGN PATENT DOCUMENTS

CN    2408043 Y    11/2000
CN    2878816 Y    3/2007
(Continued)

OTHER PUBLICATIONS

Search Report dated Jun. 18, 2018 in U380867EP, EP Application No. EP18156476, 10 pages.
(Continued)

*Primary Examiner* — Nicolas A Arnett
(74) *Attorney, Agent, or Firm* — Cantor Colburn LLP

(57) ABSTRACT

A method of operating an inflation system is provided. The method includes recognizing that the inflation system is activated or actuated by a user, supplying current to an electromagnet of a solenoid valve of the inflation system such that an armature-valve element of the solenoid valve is moved to an open position, wherein movement of the armature valve element to the open position actuates an actuator housing that in turn causes a normally-closed valve element of a valve housing of the inflation system to open, and ceasing current supply to the electromagnet once the actuator housing is actuated.

13 Claims, 7 Drawing Sheets

(51) Int. Cl.
  *B63C 9/18* (2006.01)
  *B60C 29/00* (2006.01)
  *B60R 21/268* (2011.01)
  *F16K 31/06* (2006.01)
  *F16K 15/02* (2006.01)
  *F16K 31/12* (2006.01)

(52) U.S. Cl.
  CPC ............ *F16K 15/025* (2013.01); *F16K 15/20* (2013.01); *F16K 31/0655* (2013.01); *F16K 31/0675* (2013.01); *F16K 31/12* (2013.01)

(56) References Cited

U.S. PATENT DOCUMENTS

| | | | | |
|---|---|---|---|---|
| 6,860,205 | B2* | 3/2005 | Baker | B64D 25/14 |
| | | | | 102/530 |
| 9,038,803 | B2 | 5/2015 | Dunn et al. | |
| 9,814,938 | B2* | 11/2017 | Schaer | A62B 33/00 |
| 2004/0251440 | A1* | 12/2004 | Gnadinger | F16K 7/045 |
| | | | | 251/129.05 |
| 2010/0163763 | A1 | 7/2010 | Bradford | |
| 2015/0300295 | A1* | 10/2015 | Nakano | F16K 31/0662 |
| | | | | 251/129.15 |
| 2016/0059820 | A1* | 3/2016 | Wolf | B60R 21/268 |
| | | | | 280/742 |
| 2017/0029081 | A1 | 2/2017 | Michalski | |
| 2019/0120404 | A1* | 4/2019 | John | F16K 31/42 |

FOREIGN PATENT DOCUMENTS

| | | |
|---|---|---|
| CN | 203363191 U | 12/2013 |
| DE | 102006020208 A1 | 2/2008 |
| DE | 102011086186 A1 | 5/2013 |
| DE | 102012210943 A1 | 1/2014 |
| DE | 102013207594 A1 | 10/2014 |
| WO | 2013174716 A1 | 11/2013 |

OTHER PUBLICATIONS

OA Issued Jul. 11, 2019 in U380867EP, EP Application No. EP18156476, 5 pages.

* cited by examiner

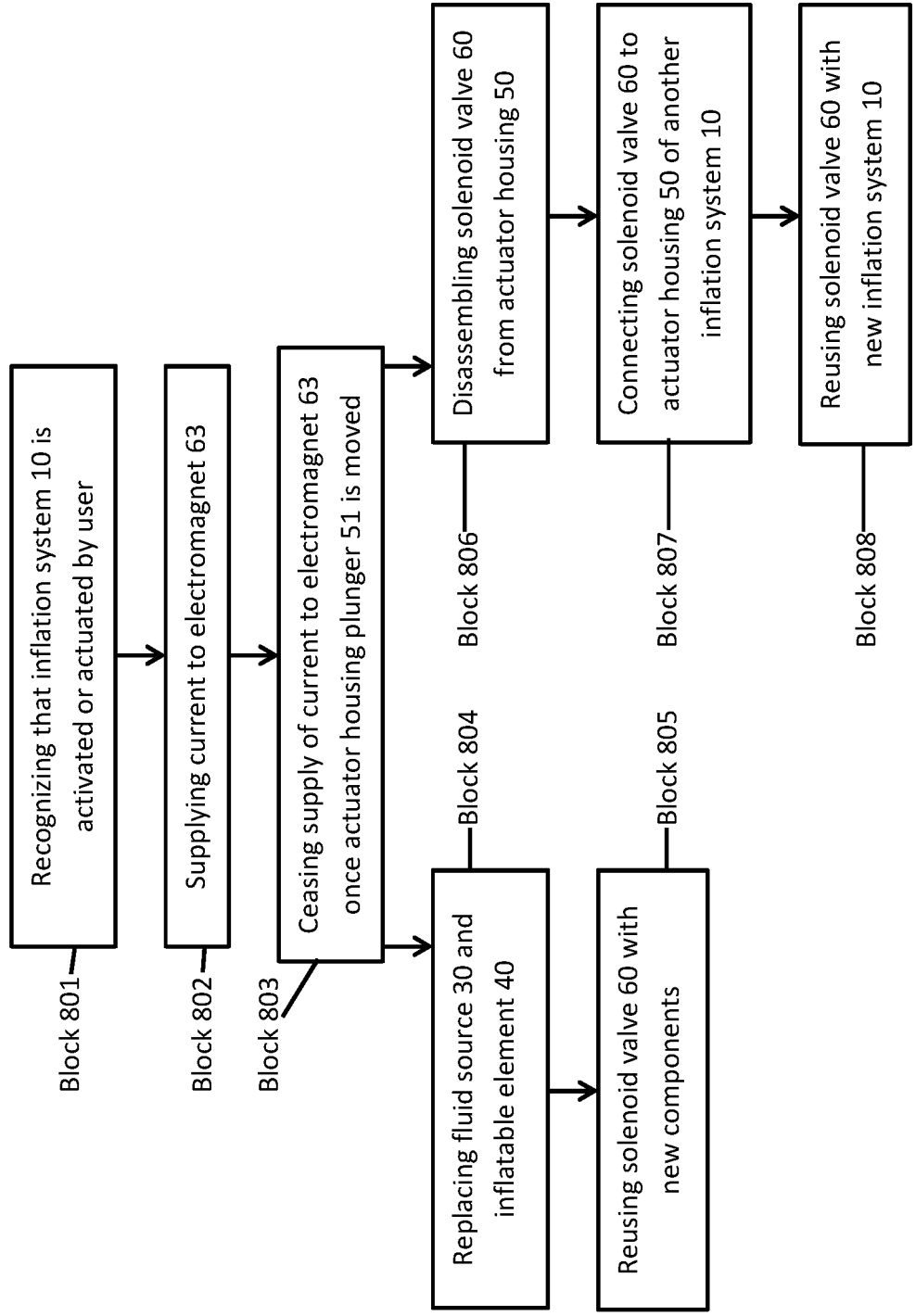

SOLENOID VALVE FOR INFLATION SYSTEM

CROSS-REFERENCE TO RELATED APPLICATIONS

This application claims priority to and the benefit of Indian Patent Application No. 201711005085 filed on Feb. 13, 2017, and all the benefits accruing therefrom under 35 U.S.C. § 119, the content of which is incorporated herein in its entirety by reference.

BACKGROUND OF THE DISCLOSURE

The subject matter disclosed herein relates to inflation systems and, more particularly, to inflation systems with fast acting pressure balanced, pilot-type solenoid valves.

Pneumatic inflation systems often use stored high pressure gas sources to inflate an inflatable element. The stored high pressure gas sources are normally designed to be discharged within a specified time by the opening of an inflation valve that is normally-closed. Some pneumatic inflation systems, such as those employed in helicopter life rafts and floats, make use of inflation valves that are actuated by electrical initiators with explosive materials. Such electrical initiators are commonly referred to as "electrical squibs" and each one typically includes a valve housing with a linear sliding-type valve element and an actuation housing with a piston seal assembly. An inlet of the inflation valve is connected to a gas bottle and the fluid pressure force is effective at the valve element. Energization of the electrical squib initiator causes an actuator piston to move in the actuator housing which in turn initiates an opening movement of the valve element to discharge the high pressure gas from the stored gas bottle to the downstream inflatable.

Being elements of survival systems, inflation valves such as those described above do not tend to include or require any return forcing elements. That is, in the initial closed position, the valve elements of the inflation valves are retained by actuator piston rod assembled inside the actuation housing, for example, but once the valve is opened by the initiator the opening position is sustained by the fluid inlet pressure force acting on the valve poppet. This leads to electrical squib initiators having certain disadvantages, such as being single shot devices and having main valve maintainability issues and safety compliance issues.

BRIEF DESCRIPTION OF THE DISCLOSURE

According to one aspect of the disclosure, a method of operating an inflation system is provided. The method includes recognizing that the inflation system is activated or actuated by a user, supplying current to an electromagnet of a solenoid valve of the inflation system such that an armature-valve element of the solenoid valve is moved to an open position, wherein movement of the armature valve element to the open position actuates an actuator housing that in turn causes a normally-closed valve element of a valve housing of the inflation system to open, and ceasing current supply to the electromagnet once the actuator housing is actuated.

In accordance with additional or alternative embodiments, the method further includes replacing a fluid source and an inflatable element of the inflation system with new components and reusing the solenoid valve with the new components.

In accordance with additional or alternative embodiments, the method further includes disassembling the solenoid valve from the actuator housing, connecting the solenoid valve to an actuator housing of a new inflation system and reusing the solenoid valve with the new inflation system.

In accordance with additional or alternative embodiments, the armature-valve element of the solenoid valve includes a plunger-type armature-valve element.

In accordance with additional or alternative embodiments, the armature-valve element of the solenoid valve includes a pilot-type armature-valve element.

According to another aspect of the disclosure, a solenoid valve assembly is provided. The solenoid valve assembly includes a valve housing to which a fluid source and an inflatable are connected, an actuator housing coupled to the valve housing and configured when actuated to open a normally-closed valve element in the valve housing whereby pressurized fluid is permitted to flow from the fluid source to the inflatable and a solenoid valve coupled to the actuator housing. The solenoid valve includes a valve seat, a pilot-type armature-valve element fluidly communicative with the fluid source and normally pressure balanced to remain in a closed position relative to the valve seat and an electromagnet. The electromagnet generates magnetic flux that moves the pilot-type armature-valve element into an open position relative to the valve seat such that at least a portion of the pressurized fluid flows into the actuator housing through the valve seat to actuate the actuator housing.

In accordance with additional or alternative embodiments, the valve housing includes the normally-closed valve element and a body having an inlet connectable with the fluid source and an outlet connectable with the inflatable. The body defines a first pathway connecting the fluid source and the inflatable in which the normally-closed valve element is seated, a second pathway receptive of an actuator housing plunger and a third pathway by which the portion of the pressurized fluid is supplied for flow into the actuator housing.

In accordance with additional or alternative embodiments, the solenoid valve further includes a solenoid valve housing which is supportive of the valve seat, the pilot-type armature-valve element and the electromagnet and an elastic element to bias the pilot-type armature-valve element toward the valve seat. The elastic element is sized to be overpowered by electromagnetic forces applied to the pilot-type armature-valve element by the magnetic flux.

In accordance with additional or alternative embodiments, the solenoid valve further includes an O-ring seal and a poral filter to permit fluid leakage and to prevent external contamination.

In accordance with additional or alternative embodiments, the valve seat defines a central bore through which the pressurized fluid flows into the actuator housing.

In accordance with additional or alternative embodiments, the pilot-type armature-valve element includes a body, a valve seal at a first end of the body to form a seal with the valve seat with the pilot-type armature-valve element in the closed position, an armature shaft responsive to the magnetic flux generated by the electromagnet extending from a second end of the body and a piston head which forms a single air gap with a housing of the solenoid valve and to which a distal end of the armature shaft is coupled.

According to yet another aspect of the disclosure, an inflation system is provided. The inflation system includes a valve housing, a fluid source connected to an inlet of the valve housing, an inflatable connected to an outlet of the valve housing, an actuator housing coupled to the valve housing and configured when actuated to open a normally-closed valve element in the valve housing whereby pressurized fluid is permitted to flow from the fluid source at the inlet to the inflatable at the outlet and a solenoid valve coupled to the actuator housing. The solenoid valve includes a valve seat, a pilot-type armature-valve element fluidly communicative with the fluid source and normally pressure balanced to remain in a closed position relative to the valve seat and an electromagnet. The electromagnet generates magnetic flux that moves the pilot-type armature-valve element into an open position relative to the valve seat such that at least a portion of the pressurized fluid flows into the actuator housing through the valve seat to actuate the actuator housing.

In accordance with additional or alternative embodiments, the valve housing includes the normally-closed valve element and a body having an inlet connectable with the fluid source and an outlet connectable with the inflatable. The body defines a first pathway connecting the fluid source and the inflatable in which the normally-closed valve element is seated, a second pathway receptive of an actuator housing plunger and a third pathway by which the portion of the pressurized fluid is supplied for flow into the actuator housing.

In accordance with additional or alternative embodiments, the fluid source is initially charged with the pressurized fluid.

In accordance with additional or alternative embodiments, the inflatable includes an inflatable bladder.

In accordance with additional or alternative embodiments, the solenoid valve further includes a solenoid valve housing which is supportive of the valve seat, the pilot-type armature-valve element and the electromagnet and an elastic element to bias the pilot-type armature-valve element toward the valve seat. The elastic element is sized to be overpowered by electromagnetic forces applied to the pilot-type armature-valve element by the magnetic flux.

In accordance with additional or alternative embodiments, the solenoid valve further includes an O-ring seal and a poral filter to permit pressure balancing and venting of O-ring seal leaked fluid and to prevent external contamination.

In accordance with additional or alternative embodiments, the valve seat defines a central bore through which the pressurized fluid flows into the actuator housing.

In accordance with additional or alternative embodiments, the pilot-type armature-valve element includes a body, a valve seal at a first end of the body to form a seal with the valve seat with the pilot-type armature-valve element in the closed position, an armature shaft responsive to the magnetic flux generated by the electromagnet extending from a second end of the body and a piston head which forms a single air gap with a housing of the solenoid valve and to which a distal end of the armature shaft is coupled.

In accordance with additional or alternative embodiments, a controller controls when the electromagnet is supplied with current and is configured to cease current supply to the electromagnet once the actuator housing is actuated.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 8 is a flow diagram illustrating a method of operating an inflation system in accordance with embodiments.

Figure 1:
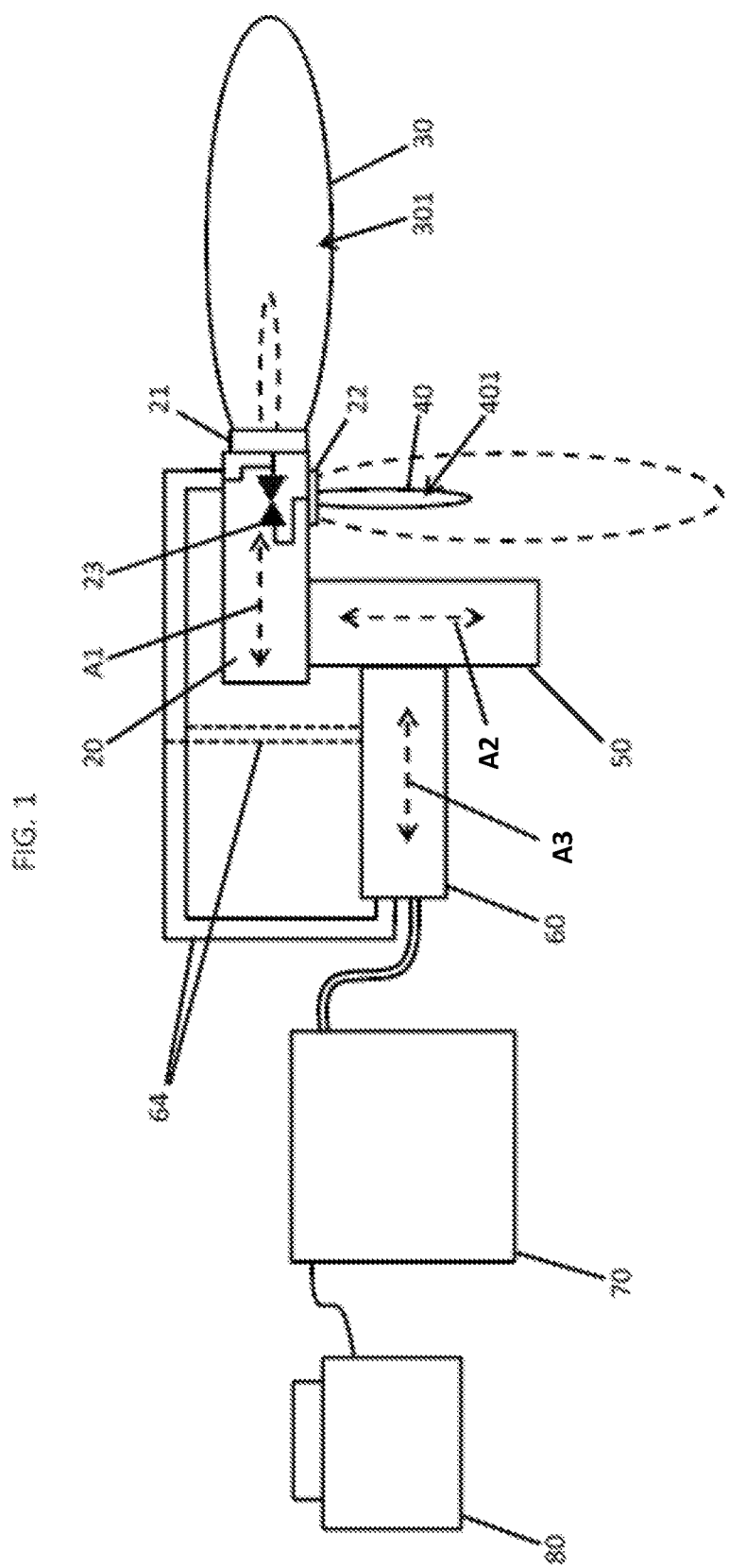
FIG. 1 is a schematic illustration of an inflation system in accordance with embodiments.
Figure 2:
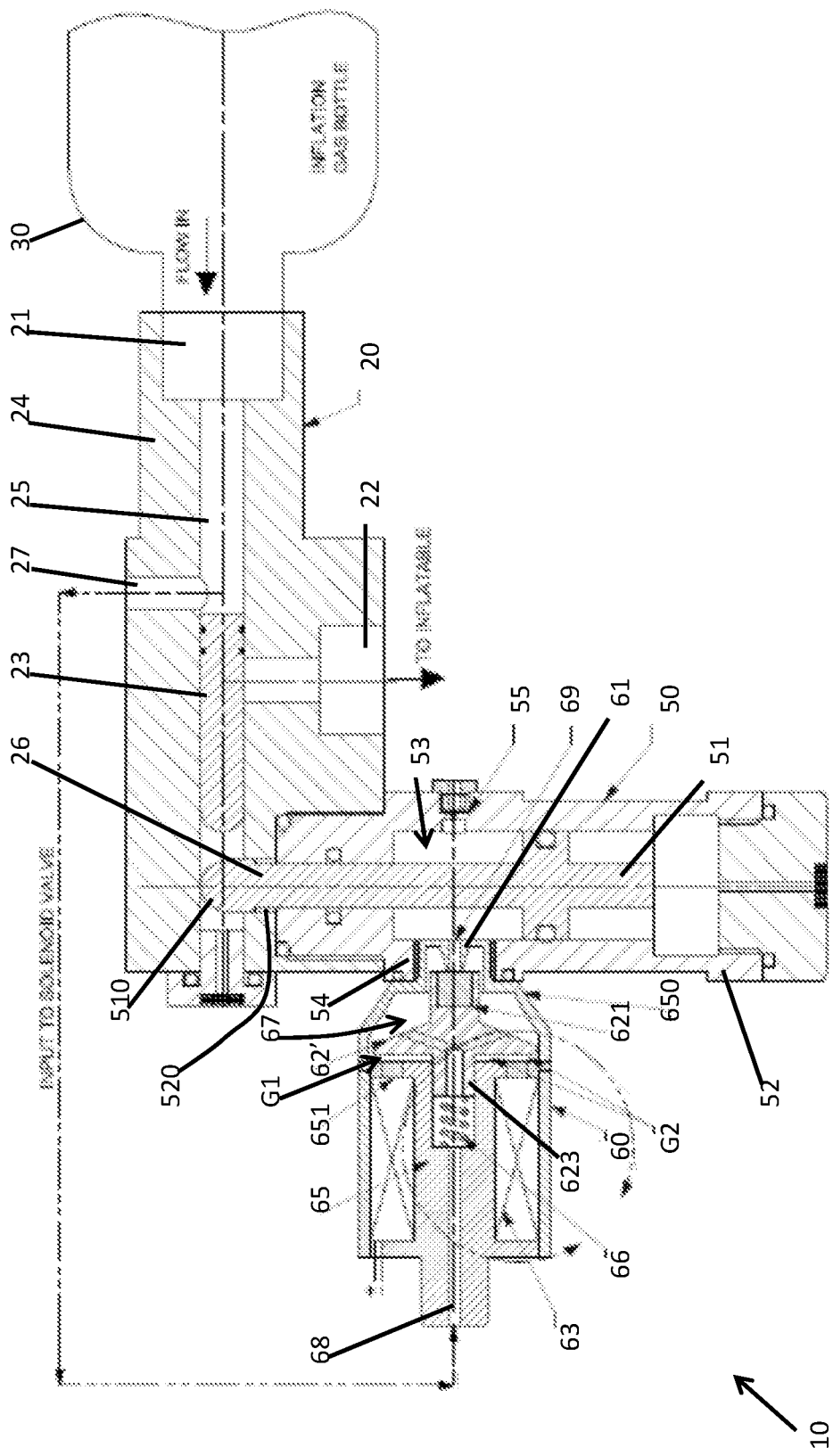
FIG. 2 is a side view of a solenoid valve having a disk-type armature in a closed position for use in an inflation system in accordance with embodiments.

The detailed description explains embodiments of the disclosure, together with advantages and features, by way of example with reference to the drawings.

DETAILED DESCRIPTION OF THE DISCLOSURE

As will be described below, a fast acting and non-explosive initiator is provided and can be retro-fitted into an inflation system as a replacement for an electrical squib initiator. The fast acting and non-explosive electrical initiator is repeatedly usable and provides for consistent and reliable performance to facilitate the maintenance of inflation unit. The fast acting and non-explosive electrical initiator includes a fast acting and normally-closed pneumatic plunger-type or pilot-type solenoid valve that is receptive of high pressure working fluid from an inlet of an inflation valve and employs electro-pneumatic action to admit pneumatic pressurized fluid into an actuator cavity of an inflation valve with electrical control. The interfacing element is the fast acting solenoid with either a flat armature that has two working air gaps or an armature shaft that has a single working air gap, both of which are designed to meet the actuation time of the inflation valve.

With reference to FIGS. 1-4, an inflation system 10 is provided. The inflation system 10 includes a valve housing 20 having an inlet 21 and an outlet 22, a fluid source 30 that is connected to the inlet 21, an inflatable element 40 that is connected to the outlet 22, an actuator housing 50 and a solenoid valve 60. The inflation system 10 may further include a controller 70 and a user actuated device 80 both of which will be described in greater detail below. The actuator housing 50 is coupled to an end of the valve housing 20 opposite the inlet 21 and is configured, when actuated, to open or cause to open a normally-closed valve element 23 that is seated in the valve housing 20 whereby pressurized fluid is permitted to flow from the fluid source 30 at the inlet 21 to the inflatable element 40 at the outlet 22.

The fluid source 30 may be provided as a fluid canister 301 and is initially charged with the pressurized fluid. The inflatable element 40 may be provided as an inflatable bladder 401 or balloon. Therefore, as shown in FIG. 1, as pressurized fluid moves from the fluid source 30 to the inflatable element 40, a volume of the pressurized fluid in the fluid source 30 is reduced while a volume of the pressurized fluid in the inflatable element 40 is increased. In accordance with alternative embodiments, it is to be understood that the volume of at least the fluid source 30 may remain constant or substantially throughout an inflation event. That is, in some case, as pressurized fluid moves from the fluid source 30 to the inflatable element 40, a volume of the pressurized fluid in the fluid source 30 remains constant while a pressure in its interior decreases and the volume of the pressurized fluid in the inflatable element 40 increases.

The solenoid valve 60 is coupled to the actuator housing 50 and includes a valve seat 61, an armature-valve element 62 that could be provided, for example, as a plunger-type armature-valve element 62' (illustrated in FIGS. 2-5) or as a pilot-type armature valve element 62" (illustrated in FIGS. 6 and 7) and an electromagnet 63. For purposes of clarity and brevity, it is to be understood that as used herein the term "armature-valve element 62" refers to both the plunger-type armature-valve element 62' and the pilot-type armature valve element 62" whereas descriptions of the plunger-type embodiments will include the 62' identifier and descriptions of the pilot-type embodiments will include the 62" identifier.

The armature-valve element 62 is fluidly communicative with the fluid source 30 by way of bypass piping 64, which is indirectly coupled at a first end thereof to the fluid source 30 and at a second end thereof to the solenoid valve 60, and is normally pressure balanced to remain in a closed position relative to the valve seat 61. The electromagnet 63 may be supplied with current. In such cases where the electromagnet 63 is supplied with current, the electromagnet 63 generates magnetic flux that interacts with the armature-valve element 62 and thus moves the armature-valve element 62 into an open position relative to the valve seat 61. This in turn allows at least a portion of the pressurized fluid to flow into the actuator housing 60 through the valve seat 61 to thereby actuate the actuator housing 50 to open or cause to open the normally-closed valve element 23.

The valve housing 20 includes the normally-closed valve element 23 and a body 24. The body 24 is elongate and extends along a longitudinal axis A1 (see FIG. 1) with the inlet 21 at one end and the actuator housing 50 being coupled to the other end. The body 24 is formed to define a first pathway 25, a second pathway 26 and a third pathway 27. The first pathway 25 extends along the longitudinal axis A1 and has a length which is nearly as long as the valve housing 20. Thus, with the outlet 22 and the inflatable element 40 being positioned midway between the ends of the valve housing 20, the first pathway 25 fluidly connects the inlet 21 and the fluid source 30 with the outlet 22 and the inflatable element 40. The normally-closed valve element 23 may be provided as a variety of shapes including a plunger or a bullet-shaped plunger, and may be seated within the first pathway 25.

At an initial time, the normally-closed valve element 23 is positioned to at least block a flow of the pressurized fluid from the inlet 21 and the fluid source 30 to the outlet 22 and the inflatable element 40. However, once the actuator housing 50 is actuated, the normally-closed valve element 23 is moved along the first pathway 25 so as to permit the flow of the pressurized fluid from the inlet 21 and the fluid source 30 to the outlet 22 and the inflatable element 40. The second pathway 26 is communicative with the first pathway 25 and is receptive of an end 510 of an actuator housing plunger 51. At the initial time, the end 510 of the actuator housing plunger 51 blocks the movement of the normally-closed valve element 23 along the first pathway 25 but, when the actuator housing 50 is actuated, the actuator housing plunger 51 is moved such that the end 510 is withdrawn from the first pathway 25 along the second pathway 26 to permit that movement of the normally-closed valve element 23 along the first pathway 25. The third pathway 27 is defined through the body 24 from the first pathway 25 and leads to the bypass piping 64. Thus, the third pathway 27 provides for the portion of the pressurized fluid to be supplied to the solenoid valve 60 for eventual flow into the actuator housing 50.

The actuator housing 50 includes the actuator housing plunger 51 and a actuator housing plunger body 52. The actuator housing plunger body 52 is elongate and extends along a longitudinal axis A2 (see FIG. 1). The longitudinal axis A2 may be transversely oriented with respect to the longitudinal axis A1 and, in some cases, may be perpendicular with respect to the longitudinal axis A1. The actuator housing plunger body 52 has a first end, which is coupled to the valve housing 20 and which is formed to define an aperture 520 through which the actuator housing plunger 51 extends, and a second end opposite the first end. Midway between the first and second ends, the actuator housing 50 is formed to define an interior region 53, through which the actuator housing plunger 51 extends, an opening 54 through which the pressurized fluid flows from the solenoid valve 60 and into the actuator housing 50 and a vent 55. The interior region 53 is sealed by lateral wings of the actuator housing plunger 51, which are equipped with o-ring seals that engage with interior sidewalls of the actuator housing 50, so that the pressurized fluid which flows into the actuator housing 50 through the opening 54 causes the actuator housing plunger 51 to move downwardly and the end 510 to be withdrawn from the first pathway 25. The vent 55 allows the pressurized fluid to be exhausted into the atmosphere from the interior region 53.

The solenoid valve 60 further includes a solenoid valve housing 65 and an elastic element 66. The solenoid valve housing 65 is supportive of the valve seat 61, the armature-valve element 62 and the electromagnet 63. The solenoid valve housing 65 includes a solenoid valve housing body 650 that extends along a longitudinal axis A3 (see FIG. 1). The longitudinal axis A3 may be transversely oriented with respect to or perpendicular with the longitudinal axis A2.

The solenoid valve housing body 650 has an outer shell and a core. The outer shell is coupled to the actuator housing 50 at the opening 54 and may be integral with the valve seat 61. The core sits within the outer shell. At an end of the solenoid valve housing body 650 proximate to the actuator housing 50, the outer shell and the core cooperatively define an interior region 67. The interior region 67 is fluidly communicative with a first central bore 68 and, in some cases, with a second central bore 69. The first central bore 68 is defined through the core and leads to the second end of the bypass piping 64 (illustrated in FIGS. 2-4). The second central bore 69 is defined through the valve seat 61. The interior region 67 is fluidly communicative with the second central bore 69 when the plunger-type armature-valve element 62' moves into the open position relative to the valve seat 61 so that the pressurized fluid can flow from the interior region 67, through the second central bore 69 and into the actuator housing 50. The elastic element 66 may be provided as a compression or torsion spring and is configured and disposed to bias the plunger-type armature-valve element 62' toward the valve seat 61. To this end, the elastic element 66 is sized such that its biasing effect is overpowered by electromagnetic forces applied to the plunger-type armature-valve element 62' by the magnetic flux produced by the electromagnet 63 when the current is supplied thereto.

Figure 3:
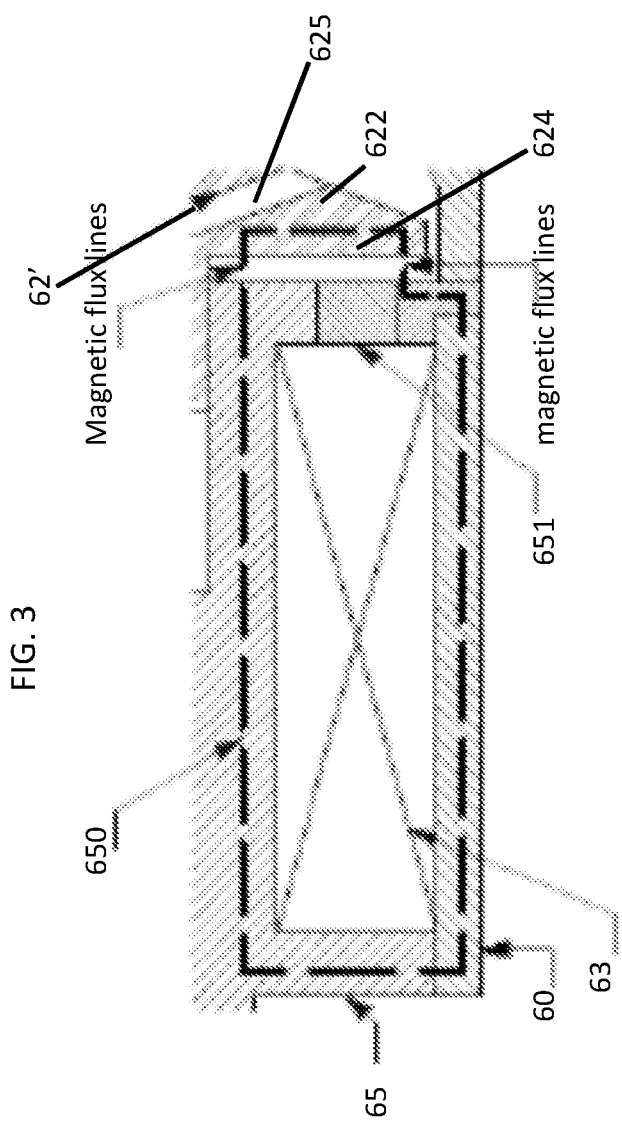
FIG. 3 is an enlarged view of the encircled portion of the solenoid valve of FIG. 2 to illustrate the housing of an electromagnet.
Figure 4:
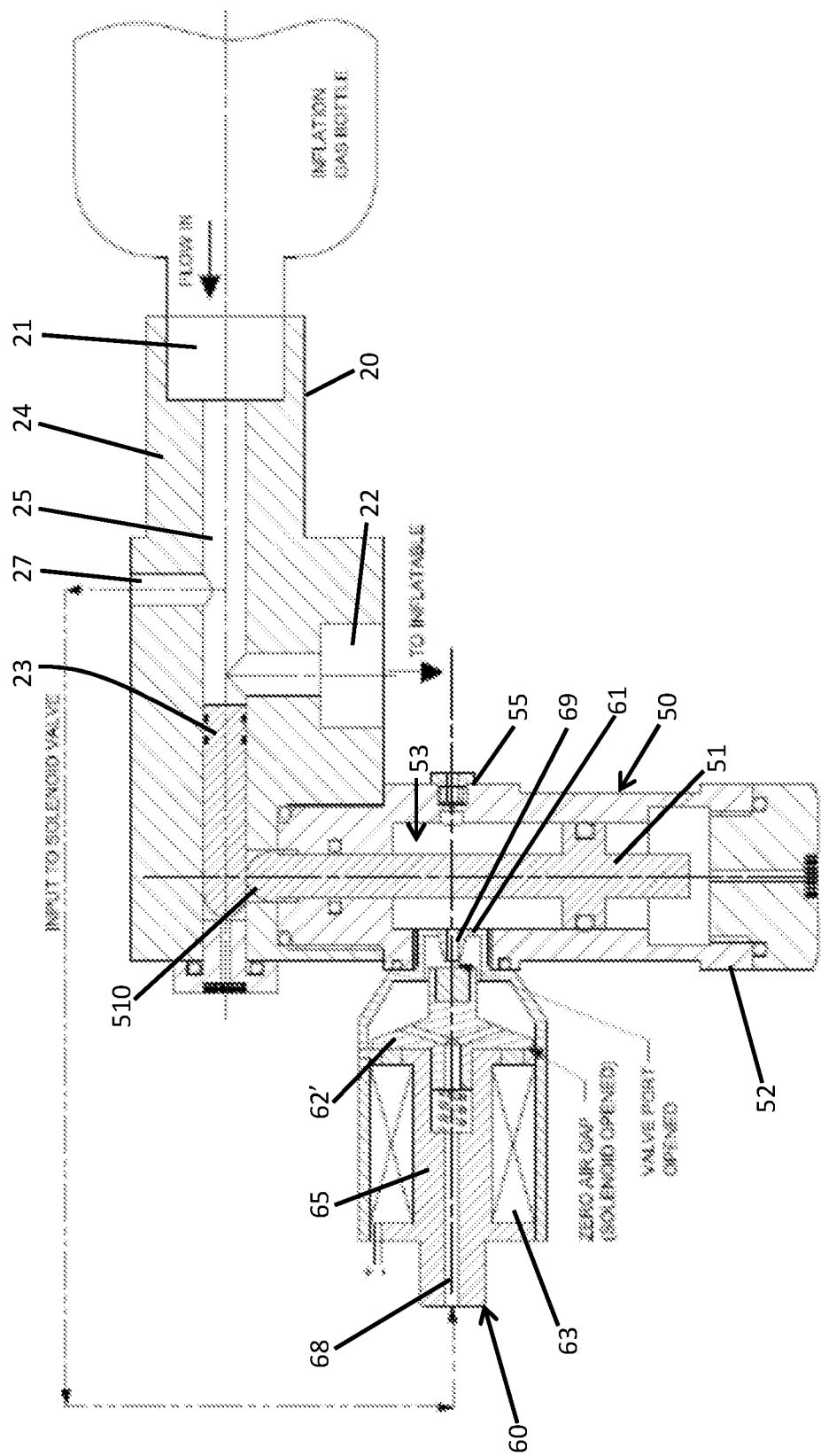
FIG. 4 is a side view of the solenoid valve having the disk-type armature of FIG. 2 in an open position.

As shown in FIG. 3, the plunger-type armature-valve element 62' includes a PL body 620, a valve seal 621 (see FIG. 2) and an armature 622. The valve seal 621 is disposed at a first end of the PL body 620 and is configured to form a seal with the valve seat 61 with the plunger-type armature-valve element 62' provided in the closed position. The armature 622 is electromagnetically responsive to the magnetic flux generated by the electromagnet 63 and is disposed at a second end of the PL body 620 opposite the first end. The armature 622 includes a central sliding guide 623 (see FIG. 2), which may be integral with the armature 622, and a flat disk 624. The flat disk 624 is, in particular, electromagnetically responsive to the magnetic flux generated by the electromagnet 63 and is disposed to define first and second air gaps G1 and G2 with the core of the solenoid valve housing body 650 when the plunger-type armature-valve element 62' is disposed in the closed position. Conversely, when the plunger-type armature-valve element 62' is disposed in the open position, the flat disk 624 abuts the core of the solenoid valve housing body 650. The central sliding guide 623 extends into and forms a seal with sidewalls of a bore defined in the core of the solenoid valve housing body 650. The solenoid valve housing body 620 is also formed to define through-holes 625 which extend through the central sliding guide 623 and the armature 622 such that the first central bore 68 is fluidly communicative with the interior region 67 even with the plunger-type armature-valve element 62' moved into the open position whereby the flat disk 624 abuts the core of the solenoid valve housing body 650.

The core of the solenoid valve housing body 650 includes non-magnetic material elements 651, which are disposed between the electromagnet 63 and the flat disk 624 of the armature 622. The magnetic flux generated by the electromagnet 63 is thus directed through the non-magnetic material elements 651 so that it crosses the first and second air gaps G1 and G2 to reach the flat disk 624 and thus applies additive electromagnetic forces thereto.

Figure 5:
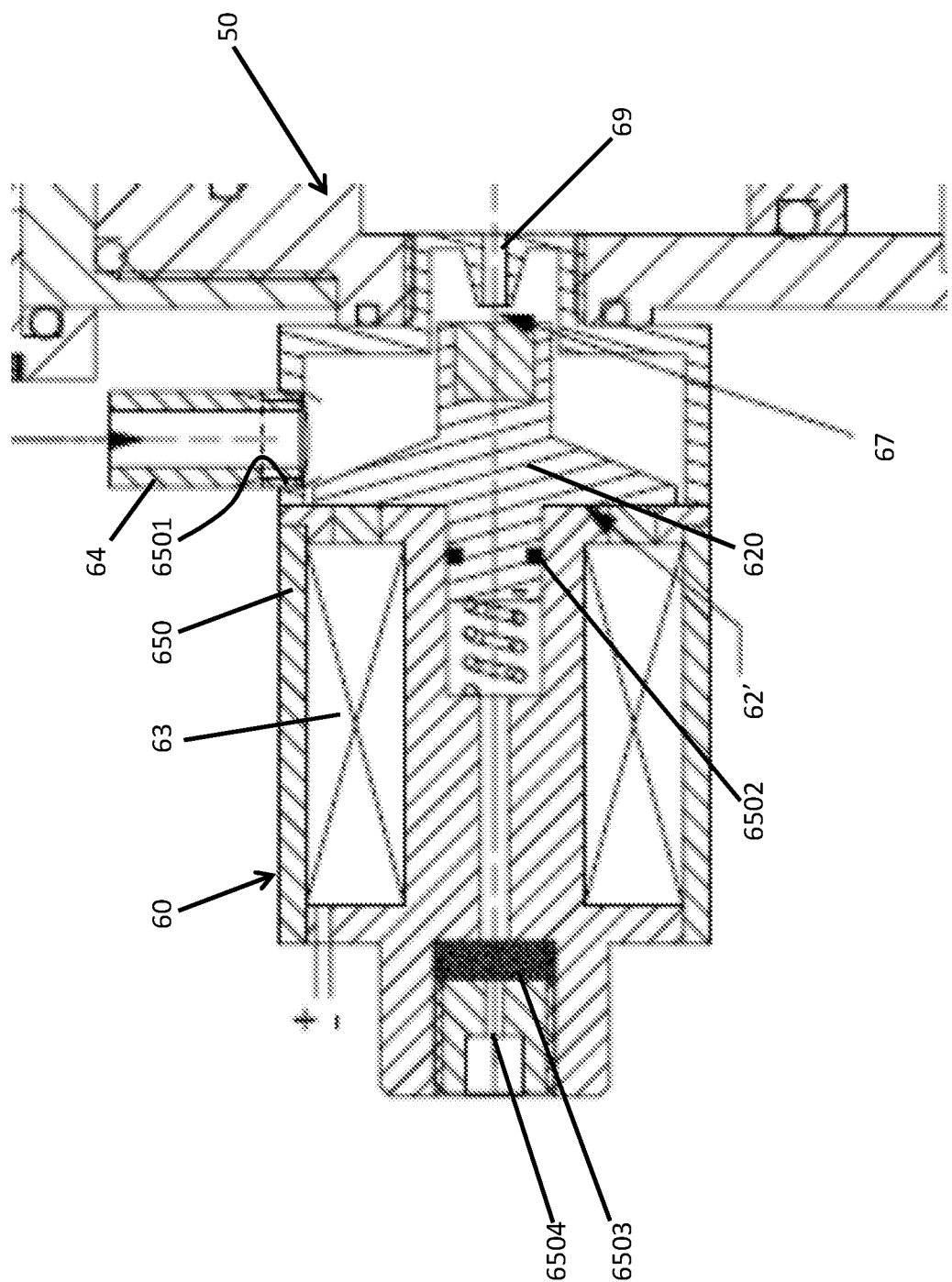
FIG. 5 is an enlarged side view of a pressure balanced solenoid valve having a plunger-type armature in an open position for use in an inflation system in accordance with alternative embodiments.

In accordance with alternative embodiments and with reference to FIG. 5, the solenoid valve housing body 650 may be formed to define a through-hole 6501 that the bypass piping 64 penetrates to allow the interior region 67 to be fluidly communicative with the bypass piping 64. In such cases, the PL body 620 does not define through-holes. Thus, when the plunger-type armature-valve element 62' is moved into the open position whereby the flat disk 624 abuts the core of the solenoid valve housing body 650, an entirety of the fluid flowing through the bypass piping 64 flows into the interior region 67 and then flows from the interior region 67 into the actuator housing 50 via the second central bore 69.

Pressure balancing for the embodiment of FIG. 5 is achieved by way of the O-ring seal 6502 which operates as a pressure balancing seal. The O-ring seal 6502 reduces the net fluid pressure force the plunger-type armature-valve element 62' has to work with. Leakage through the O-ring seal 6502 is vented out through the poral filter 6503 and the vent-hole 6504. The poral filter 6503 serves to prevent the entry of external contaminants into the interior region 67.

Figure 6:
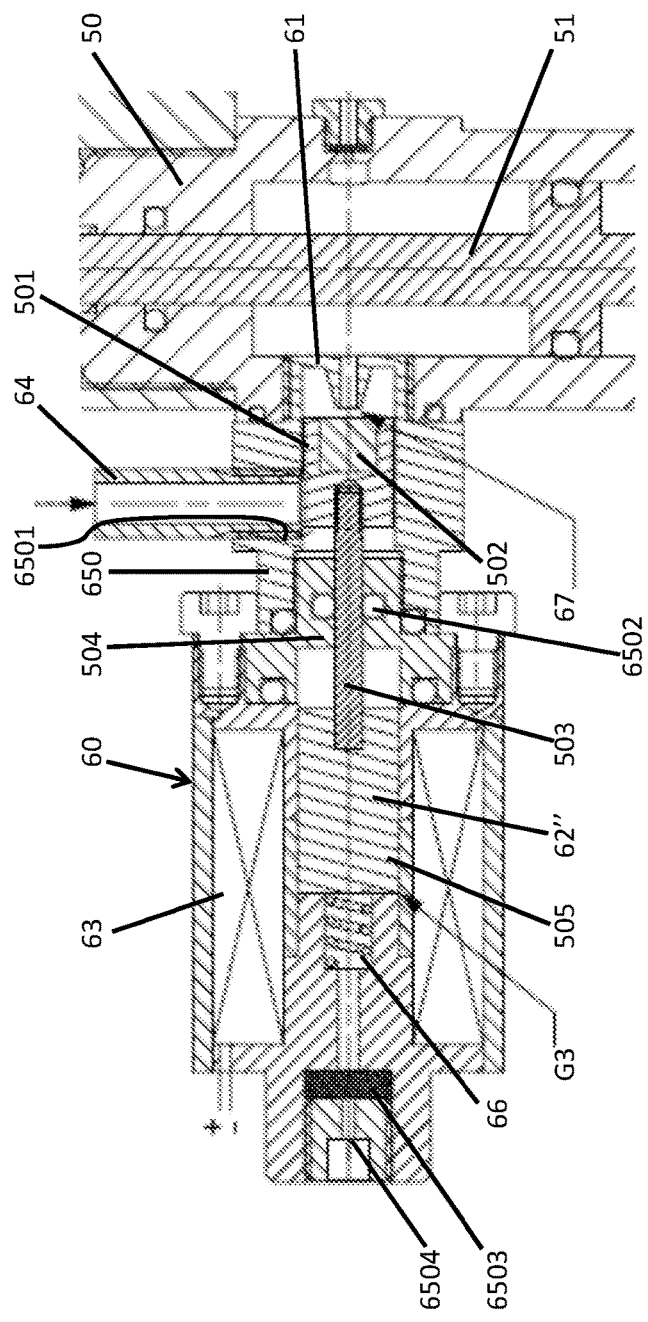
FIG. 6 is an enlarged side view of a pressure balanced solenoid valve having a pilot-type armature in an open position for use in an inflation system in accordance with alternative embodiments.
Figure 7:
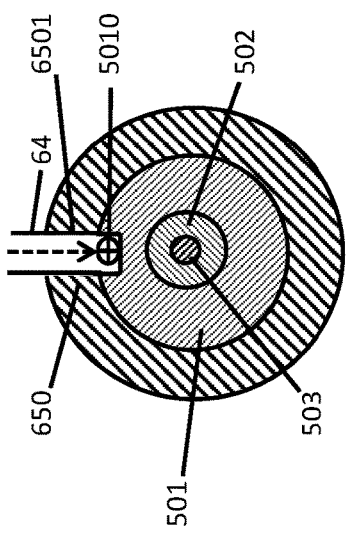
FIG. 7 is an axial view of the pilot-type armature of FIG. 6.

With reference to FIGS. 6 and 7, the pilot-type armature-valve element 62" includes a PI body 501, a valve seal 502, an armature shaft 503 that sealably extends through a central core portion 504 of the valve housing 60 and a piston head 505 to which a distal end of the armature shaft 503 is coupled. The valve seal 502 is disposed at a first end of the PI body 501 and is configured to form a seal with the valve seat 61 with the pilot-type armature-valve element 62" provided in the closed position. The armature shaft 503 is electromagnetically responsive to the magnetic flux generated by the electromagnet 63 and is disposed to extend from a second end of the PI body 501 opposite the first end. With the pilot-type armature valve element 62" provided in the closed position, the side of the piston head 505 remote from the armature shaft 503 forms a single air gap G3 with the solenoid valve housing body 650. The volume of this single air gap G3 is reduced substantially when the pilot-type armature valve element 62" is provided in the open position as shown in FIG. 6.

As shown in FIG. 7, the PI body 501 is formed to define a channel 5010 that is communicative with the bypass piping 64 which penetrates the solenoid valve housing body 650 via the through-hole 6501 formed therein. The piston head 505 is anchored to the elastic element 66.

When the electromagnet 63 is not supplied with current, the pilot-type armature-valve element 62" is biased to remain in the closed position by the elastic element 66. However, when the electromagnet 63 is supplied with current, the armature shaft 503 is forced by the magnetic flux produced by the electromagnet 63 to move the pilot-type armature-valve element 62" into the open position in opposition to the bias applied by the elastic element 66. In this open position, the volume of the single air gap G3 between the piston head 505 and the solenoid valve housing body 650 is substantially reduced and the portion of the pressurized fluid supplied by the bypass piping 64 is received in the channel 5010, permitted to flow along a longitudinal axis of the PI body 501 through the channel 5010 and toward the opening 54.

Pressure balancing for the embodiment of FIG. 6 is achieved by way of the O-ring seal 6502 which again operates as a pressure balancing seal. The O-ring seal 6502 reduces the net fluid pressure force the pilot-type armature-valve element 62" has to work with. Leakage through the O-ring seal 6502 is vented out through the poral filter 6503 and the vent-hole 6504. The poral filter 6503 serves to prevent the entry of external contaminants into the interior region 67.

With reference back to FIG. 1, the inflation system 10 may further include the controller 70 and, in some cases, the user actuated device 80 mentioned above. The controller 70 may be configured to control when the electromagnet 63 is supplied with current and to cease the current supply to the electromagnet 63 once the actuator housing 50 is actuated. That is, the controller 70 may be operably coupled to the user actuated device 80, which may be provided as a button, for example, so that when the user actuated device 80 is actuated by a user, the controller 70 permits the current to be supplied to the electromagnet 63. This will have the effect of electromagnetically forcing the armature-valve element 62 away from the valve seal 61 in opposition to the bias provided by the elastic element 66 so that the portion of the pressurized fluid can flow from the inlet 21 and through the third pathway 27 to the bypass piping 64, from the bypass piping 64 through the valve housing 20 and the opening 54 to the interior region 53 of the actuator housing 50. The pressurized fluid in the interior region 53 will then cause the actuator housing plunger 51 to move downwardly (i.e., the actuator housing 50 will be actuated) so that the normally-closed valve element 23 can be moved along the first pathway 25 to permit the flow of the pressurized fluid from the inlet 21 and the fluid source 30 to the outlet 22 and the inflatable element 40. As soon as the actuator housing plunger 51 is moved, the controller 70 will cease the supply of the current to the electromagnet 63 so that the elastic element 66 can once again move the armature-valve element 62 into the closed position with respect to the valve seat 61.

With reference to FIG. 8, a method of operation the inflation system 10 described above is provided. As shown in FIG. 8, the method includes recognizing that the inflation system 10 is activated or actuated by a user (block 801) and supplying the current to the electromagnet 63 (block 802). As noted above, this will have the effect of electromagnetically forcing the armature-valve element 62 away from the valve seal 61 in opposition to the bias provided by the elastic element 66 so that the portion of the pressurized fluid can flow from the inlet 21 and through the third pathway 27 to the bypass piping 64, from the bypass piping 64 through the valve housing 20 and the opening 54 to the interior region 53 of the actuator housing 50. The pressurized fluid in the interior region 53 will then cause the actuator housing plunger 51 to move downwardly (i.e., the actuator housing 50 will be actuated) so that the normally-closed valve element 23 can be moved along the first pathway 25 to permit the flow of the pressurized fluid from the inlet 21 and the fluid source 30 to the outlet 22 and the inflatable element 40. As soon as the actuator housing plunger 51 is moved, the method further includes ceasing the supply of the current to the electromagnet 63 so that the elastic element 66 can once again move the armature-valve element 62 into the closed position with respect to the valve seat 61 (block 803).

In accordance with embodiments, since the solenoid valve 60 is capable of repeated use due to its construction, the method may further include replacing the fluid source 30 and the inflatable element 40 (block 804) and then reusing the solenoid valve 60 with the new components (block 805). Alternatively, the method may include disassembling the solenoid valve 60 from the actuator housing 50 (block 806), connecting the solenoid valve 60 to an actuator housing 50 of another inflation system 10 (block 807) and then reusing the solenoid valve 60 with the new inflation system 10 (block 808).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A solenoid valve assembly, comprising:
a valve housing to which a fluid source and an inflatable are connected;
an actuator housing comprising a plunger having an end initially disposable in the valve housing, the actuator housing being formed to define an interior through which the plunger extends and an opening and the actuator housing being coupled to the valve housing and configured such that, when the actuator housing is actuated, the plunger moves such that the end withdraw from the valve housing to thereby open a normally-closed valve element in the valve housing whereby pressurized fluid is permitted to flow from the fluid source to the inflatable; and
a solenoid valve coupled to the actuator housing and comprising:
a valve seat;
a pilot-type armature-valve element fluidly communicative with the fluid source and normally pressure balanced to remain in a closed position relative to the valve seat; and
an electromagnet which generates magnetic flux that moves the pilot-type armature-valve element into an open position relative to the valve seat such that at least a portion of the pressurized fluid flows into the interior of the actuator housing through the valve seat and the opening to actuate the actuator housing by driving plunger movement;
wherein the pilot-type armature-valve element comprises:
a body;
a valve seal at a first end of the body to form a seal with the valve seat with the pilot-type armature-valve element in the closed position;
an armature shaft responsive to the magnetic flux generated by the electromagnet extending from a second end of the body; and
a piston head which forms a single air gap with a housing of the solenoid valve and to which a distal end of the armature shaft is coupled.

2. The solenoid valve assembly according to claim 1, wherein the valve housing comprises:
the normally-closed valve element; and
a body having an inlet connectable with the fluid source and an outlet connectable with the inflatable,
the body defining a first pathway connecting the fluid source and the inflatable in which the normally-closed valve element is seated, a second pathway receptive of an actuator housing plunger and a third pathway by which the portion of the pressurized fluid is supplied for flow into the actuator housing.

3. The solenoid valve assembly according to claim 1, wherein the solenoid valve further comprises:
a solenoid valve housing which is supportive of the valve seat, the pilot-type armature-valve element and the electromagnet; and
an elastic element to bias the pilot-type armature-valve element toward the valve seat, the elastic element being sized to be overpowered by electromagnetic forces applied to the pilot-type armature-valve element by the magnetic flux.

4. The solenoid valve assembly according to claim 1, wherein the pilot-type armature-valve element comprises a disk and a sliding guide protruding from the disk and the solenoid valve further includes:
an O-ring seal disposed about the sliding guide; and
a poral filter displaced from a distal end of the sliding guide along a vent hole defined through the solenoid valve to permit fluid leakage and to prevent external contamination.

5. The solenoid valve assembly according to claim 1, wherein the valve seat defines a central bore through which the pressurized fluid flows into the actuator housing.

6. An inflation system, comprising:
a valve housing;
a fluid source connected to an inlet of the valve housing;
an inflatable connected to an outlet of the valve housing;
an actuator housing comprising a plunger having an end initially disposable in the valve housing, the actuator housing being formed to define an interior through which the plunger extends and an opening and the actuator housing being coupled to the valve housing and configured such that, when the actuator housing is actuated, the plunger moves such that the end withdraws from the valve housing to thereby open a normally-closed valve element in the valve housing whereby pressurized fluid is permitted to flow from the fluid source at the inlet to the inflatable at the outlet; and a solenoid valve coupled to the actuator housing and comprising:

a valve seat;

a pilot-type armature-valve element fluidly communicative with the fluid source and normally pressure balanced to remain in a closed position relative to the valve seat; and an electromagnet which generates magnetic flux that moves the pilot-type armature-valve element into an open position relative to the valve seat such that at least a portion of the pressurized fluid flows into the interior of the actuator housing through the valve seat and the opening to actuate the actuator housing by driving plunger movement;

wherein the pilot-type armature-valve element comprises:

a body;

a valve seal at a first end of the body to form a seal with the valve seat with the pilot-type armature-valve element in the closed position;

an armature shaft responsive to the magnetic flux generated by the electromagnet extending from a second end of the body; and a piston head which forms a single air gap with a housing of the solenoid valve and to which a distal end of the armature shaft is coupled.

7. The inflation system according to claim 6, wherein the valve housing comprises:

the normally-closed valve element; and a body having an inlet connectable with the fluid source and an outlet connectable with the inflatable, the body defining a first pathway connecting the fluid source and the inflatable in which the normally-closed valve element is seated, a second pathway receptive of an actuator housing plunger and a third pathway by which the portion of the pressurized fluid is supplied for flow into the actuator housing.

8. The inflation system according to claim 6, wherein the fluid source is initially charged with the pressurized fluid.

9. The inflation system according to claim 6, wherein the inflatable comprises an inflatable bladder.

10. The inflation system according to claim 6, wherein the solenoid valve further comprises:

a solenoid valve housing which is supportive of the valve seat, the pilot-type armature-valve element and the electromagnet; and an elastic element to bias the pilot-type armature-valve element toward the valve seat, the elastic element being sized to be overpowered by electromagnetic forces applied to the pilot-type armature-valve element by the magnetic flux.

11. The inflation system according to claim 6, wherein the pilot-type armature-valve element comprises a disk and a sliding guide protruding from the disk and the solenoid valve further comprises:

an O-ring seal disposed about the sliding guide; and a poral filter displaced from a distal end of the sliding guide along a vent hole defined through the solenoid valve to permit pressure balancing and venting of O-ring seal leaked fluid and to prevent external contamination.

12. The inflation system according to claim 6, wherein the valve seat defines a central bore through which the pressurized fluid flows into the actuator housing.

13. The inflation system according to claim 6, further comprising a controller to control when the electromagnet is supplied with current and to cease current supply to the electromagnet once the actuator housing is actuated.

\* \* \* \* \*